United States Patent
Taniguchi et al.

(10) Patent No.: US 6,255,644 B1
(45) Date of Patent: Jul. 3, 2001

(54) OPTICAL ROTARY ENCODER

(75) Inventors: Mitsuyuki Taniguchi; Masato Aochi, both of Gotenba (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/242,726

(22) PCT Filed: Jun. 23, 1998

(86) PCT No.: PCT/JP98/02786

§ 371 Date: Apr. 13, 1999

§ 102(e) Date: Apr. 13, 1999

(87) PCT Pub. No.: WO98/59218

PCT Pub. Date: Dec. 30, 1998

(30) Foreign Application Priority Data

Jun. 23, 1997 (JP) .................................................. 9-183061

(51) Int. Cl.[7] .................................................. G01D 5/347
(52) U.S. Cl. .............................. 250/231.13; 250/231.14; 250/231.16; 250/237 G
(58) Field of Search ................... 250/231.13, 231.14, 250/231.15, 231.16, 231.17, 231.18, 237 G; 359/234, 235

(56) References Cited

U.S. PATENT DOCUMENTS

| | | | |
|---|---|---|---|
| 3,598,493 | * 8/1971 | Fisher | 250/231.16 |
| 4,326,128 | * 4/1982 | Klein | 250/231.14 |
| 4,716,289 | * 12/1987 | Guerrini et al. | 359/235 |
| 4,780,703 | * 10/1988 | Ishida et al. | 341/6 |
| 4,942,295 | * 7/1990 | Brunner et al. | 250/231.13 |
| 4,972,080 | * 11/1990 | Taniguchi | 250/231.16 |
| 5,126,560 | 6/1992 | Kraus . | |
| 5,640,007 | * 6/1997 | Talbott et al. | 250/231.15 |
| 5,762,510 | * 6/1998 | Taniguchi et al. | 439/271 |
| 5,984,564 | * 11/1999 | Mitterreiter | 403/305 |

FOREIGN PATENT DOCUMENTS

| | | |
|---|---|---|
| 0160535 A2 | 11/1985 | (EP) . |
| 0423533 A2 | 10/1990 | (EP) . |
| 2051353 | 1/1981 | (GB) . |
| 61-20907 | 2/1986 | (JP) . |
| 62-81859 | 5/1987 | (JP) . |
| 7-234103 | 9/1987 | (JP) . |
| 62-5130 | 12/1987 | (JP) . |
| 1-210182 | 8/1989 | (JP) . |
| 2-30508 | 2/1990 | (JP) . |
| 2-119514 | 9/1990 | (JP) . |
| 3-6107 | 1/1991 | (JP) . |
| 4-132910 | 5/1992 | (JP) . |
| 5-84818 | 11/1993 | (JP) . |

* cited by examiner

*Primary Examiner*—John R. Lee
(74) *Attorney, Agent, or Firm*—Staas & Halsey LLP

(57) ABSTRACT

An optical rotary encoder simple in construction and capable of easily securing an aligned state of a code plate with a rotating shaft A disk DS and an attachment portion DM of a code plate (6) are formed of an integrated plastic molded product, so that the assembly work for the code plate (6) itself is unnecessary. A lens group is formed in a predetermined region of the disk DS. When a fitting portion RE of a shaft member (20) is press fitted into an insertion hole DE, alignment holding portions (J1 to J3) are deformed plastically to thereby achieve the alignment. The attachment portion DM and the shaft member (20) are fixed to each other by engaging a fixing bolt BL with threaded holes DH and RH. A plurality of alignment holding portions (K1 to K3) may be provided at the outer peripheral surface of the attachment portion DM. In this case, the alignment is achieved by press fitting the attachment portion DM into a fitted portion RF and plastically deforming the alignment holding portions (K1 to K3). The alignment holding portions may be provided so as to be deformed elastically in the radial direction. Also, a tapered fitting structure may be adopted.

9 Claims, 12 Drawing Sheets

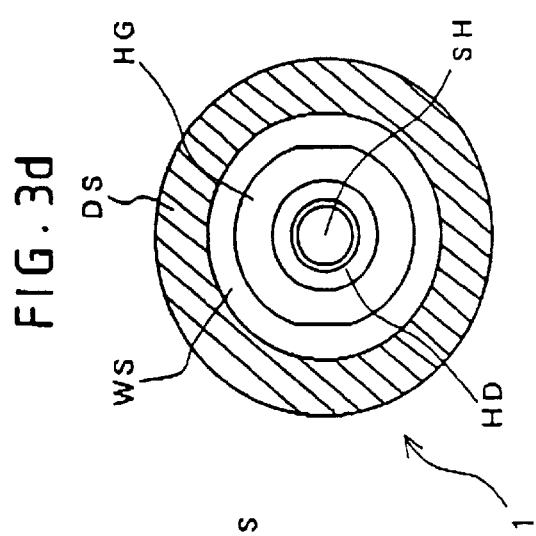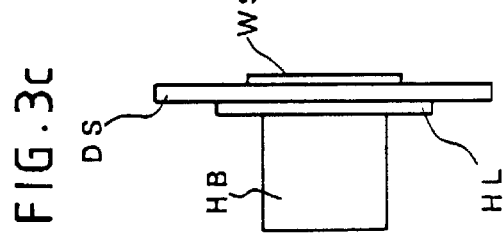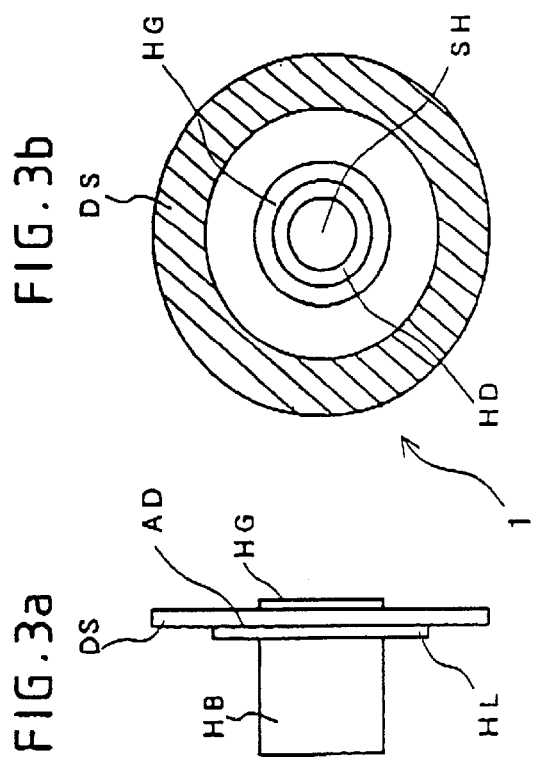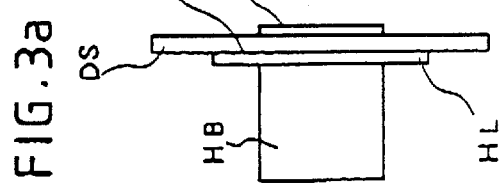

FIG. 5
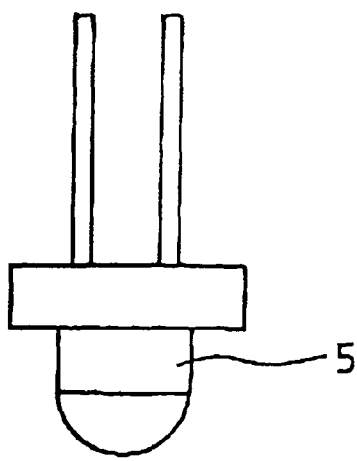
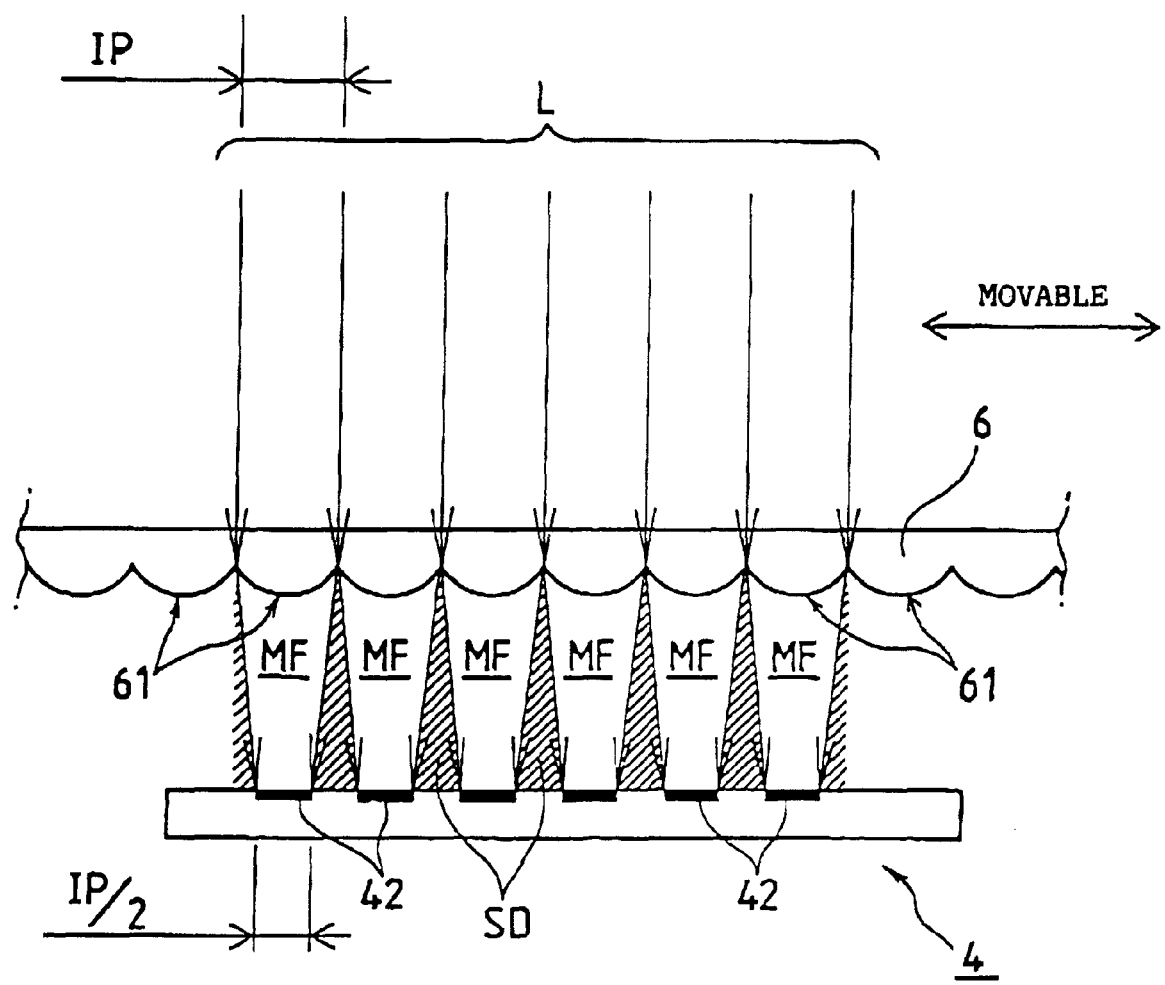

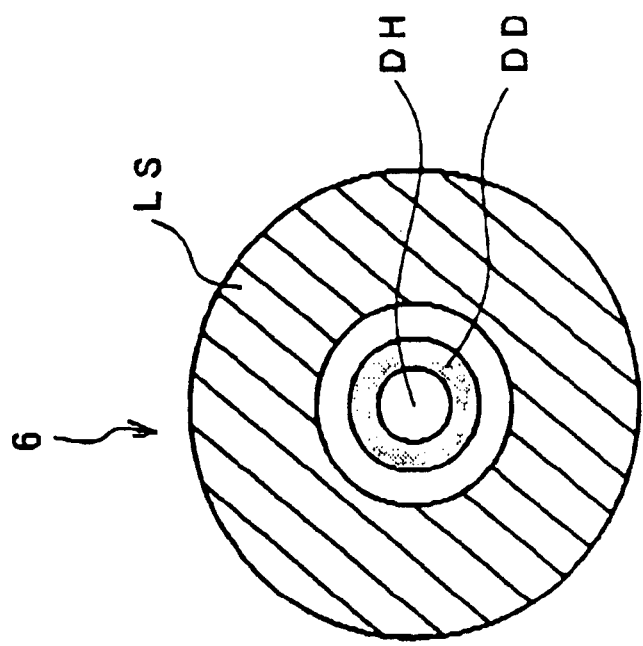
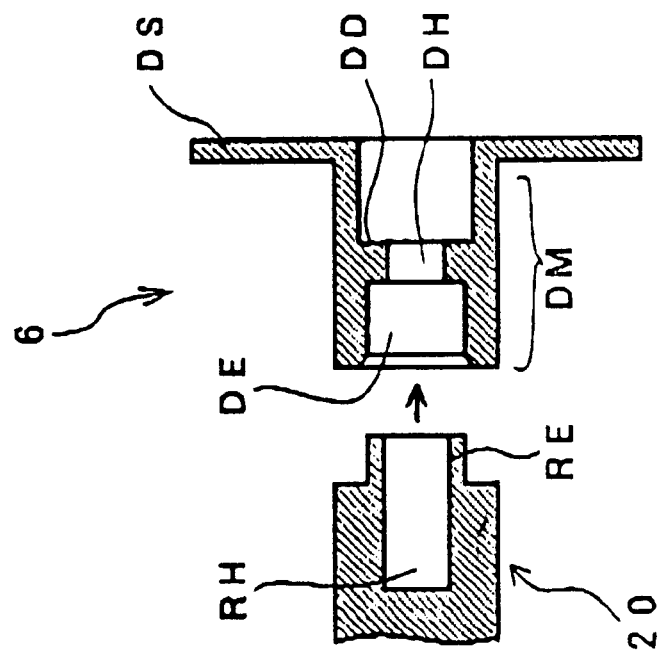
FIG. 6b
FIG. 6a

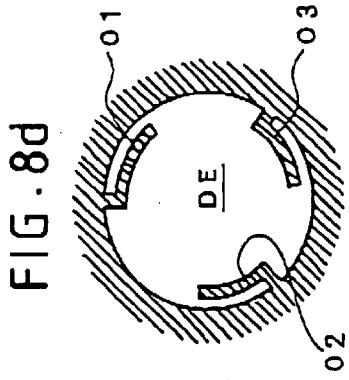
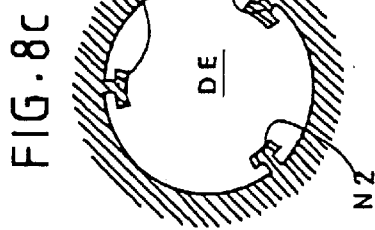
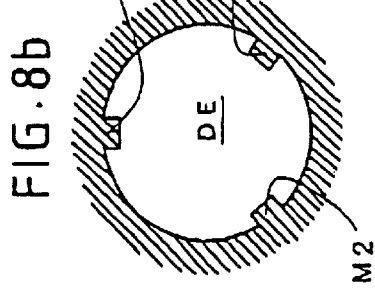
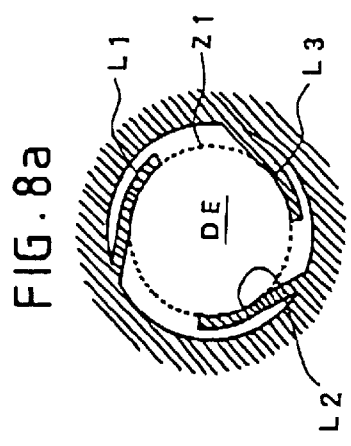
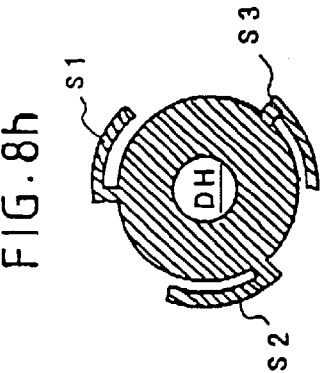
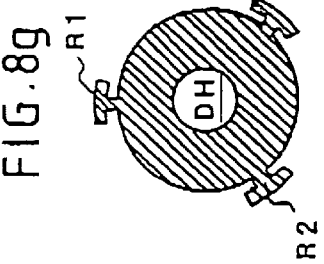
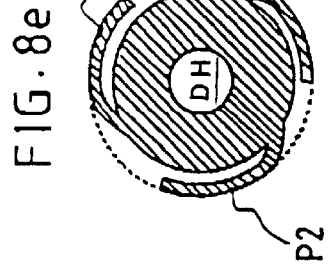

FIG. 11
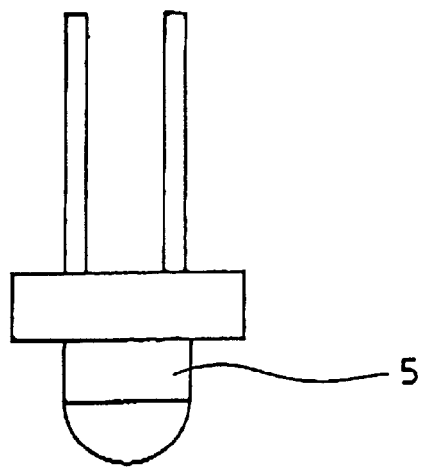
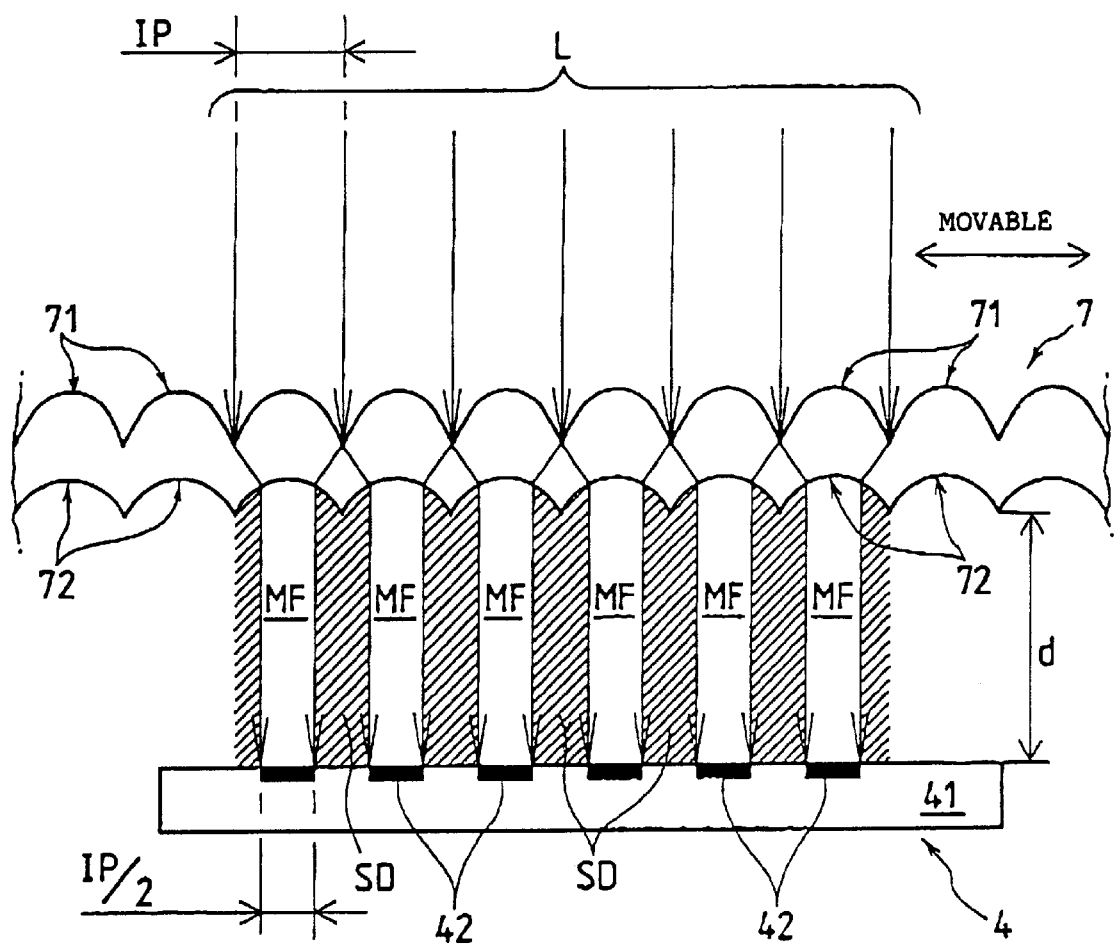

OPTICAL ROTARY ENCODER

TECHNICAL FIELD

The present invention relates to an optical rotary encoder, and more particularly to an optical rotary encoder in which plastic molding technology can be applied to the code plate and its attachment structure. The present invention is advantageously applied particularly to an optical rotary encoder using a plurality of plastic lens elements as discrete beam generating means.

BACKGROUND ART

Optical rotary encoders are widely used to detect the position and/or speed of a rotating object. FIG. 1 schematically shows a basic construction of an optical detection section of the optical rotary encoder. As shown in FIG. 1, the optical detection section has a code plate 1 constituting a rotational slit plate, a rotating shaft 2, a fixed slit 3, a light receiving section 4, and a light emitting section 5 as basic elements. The light emitting section 5 incorporates a lens or the like for making a beam parallel as well as one or a plurality of light emitting devices (for example, LEDs).

Part of a beam (stationary beam) L emitted from the light emitting section 5 is detected by the light receiving section 4 after passing through light transmittingportions of the code plate 1 and the fixed slit 3 in succession, and almost all of the remaining beam is obstructed by a light intercepting portions of the code plate 1 or the fixed slit 3.

FIG. 2 shows a general cross-sectional construction of the code plate 1, fixed slit 3, and light receiving section 4 used in the rotary encoder having the basic construction shown in FIG. 1. As shown in FIG. 2, a movable slit in the code plate 1 has a function of periodically distributing the stationary beam L emitted from the light emitting section 5 and converting it into a plurality of discrete beams moving according to the motion of an object being checked (for example, a rotor shaft of motor).

For the code plate 1, light intercepting portions 12 and light transmitting portions 13 are formed periodically on the surface (one surface or both surfaces) of a transparent board 11 with a pitch of a half of a predetermined reference pitch IP. As the transparent board 11, an optical material such as a glass plate is used. The light intercepting portions 12 and the light transmitting portions 13 are formed by chromium depositing the whole surface of the transparent board 11 and then by selectively removing the chromium deposition film by etching. The portions from which the chromium deposition film is removed by etching serve as light transmitting portions 13, and the remaining portions serve as light intercepting portions 12.

The construction and manufacturing method of the fixed slit 3 are the same as those of the code plate 1. Specifically, light intercepting portions 32 and light transmitting portions 33 are formed periodically on the surface (one surface or both surfaces) of a transparent board 31 with a pitch of a half of the reference pitch IP, which is the same as that of the code plate 1. As the transparent board 31, an optical material such as a glass plate is used, and on the surface thereof the light intercepting portions 32 are formed by using a chromium deposition film or the like. As in the case of the movable slit, the chromium deposition film can selectively be removed by etching to form board regions corresponding to the light transmitting portions 33. Alternatively, the light transmitting portions 33 may be formed by machining, for example, punching the board 31 made of a light intercepting material.

The light receiving section 4 has light receiving devices (for example, photodiodes) 42 arranged on a board 41 with a pitch of a half of the reference pitch IP. When the rotating shaft 2 connected to a rotor of motor or the like is rotated, the code plate 1 is rotated, so that the rotational position of the light transmitting portion 13 formed on the code plate 1 changes. Accordingly, the discrete beam is scanned, and the lapping relationship with the light transmitting portion 33 formed on the fixed slit 3 changes periodically.

The light incident on the light receiving device (light sensing zone) 42 is converted into an electrical signal, while the light incident on the region (light non-sensing zone) where the light receiving device (light sensing zone) 42 is not provided is not converted into an electrical signal. As a result, of the quantity of light contained in the to-be-scanned beam, the proportion of the quantity of light incident on the light receiving device (light sensing zone) 42 on the light receiving section 4 changes periodically. The periodical electrical signal thus formed is processed by a publicly known processing circuit. It is to be noted that FIG. 2 shows a state in which there is established a positional relationship such that the light transmitting portions 13 of the code plate 1 agree with the light transmitting portions 33 of the fixed slit 3.

The optical rotary encoder having the optical detection section of such a conventional construction has several problems as described below.

Problem 1: The stationary beam from the light emitting section is made the movable discrete beam having periodical light and shade by the light intercepting/transmitting function of the movable slit, and then a light detection signal is obtained according to the position of movable slit (the relative position with respect to the fixed slit or light receiving device). Therefore, the utilization efficiency of light is poor. That is, of the light emitted from the light emitting section, at least a half thereof (the hatched portion in FIG. 2) cannot contribute at all to the formation of signal. Specifically, at the time when the light emitted from the light emitting section is converted into the movable discrete beam, almost a half of the quantity of light has already been wasted, so that an efficient signal output cannot be obtained.

Problem 2: In order to form a light and shade lattice having the light transmitting portions and light intercepting portions on the code plate 1 and fixed slit 3, troublesome and costly processes such as chromium deposition, etching, and machining are needed, which increases the cost of the whole optical rotary encoder.

Problem 3: In order to attach the code plate to the rotating shaft member, a plurality of attaching portions continuous with the code plate is needed. It is actually difficult to configure the attaching portions integrally (as one member) with a body portion (disk member) of the code plate, so that the whole code plate is made up of two or three members. For this reason, the code plate is easily affected by errors of fabrication accuracy and assembly accuracy of these parts, especially the alignment accuracy for alignment with the shaft member. Also, the burden of assembly work for decreasing these errors is heavy.

FIGS. 3a to 3d show code plates of the conventional optical rotary encoder. FIGS. 3a and 3b show an example of code plate made up of two members, and FIGS. 3c and 3d show an example of code plate made up of three members.

In the example of code plate made up of two members as shown in FIGS. 3a and 3b, a disk DS constituting the body portion of the code plate 1 is joined to a collar portion HL of a hub HB serving as an attaching portion to a shaft member (not shown). As the material of the disk DS, glass is used. In the region indicated by hatching in the front view, a code element (lattice pattern of transmitting portions and intercepting portions) as shown in FIG. 2 is formed by chromium deposition or the like. Also, the hub HB including the collar portion HL is made of a metal such as aluminum or brass, and an adhesive AD suitable for bonding of metal to glass is used for the joining of the collar portion HL.

The hub HB has a hollow construction, and as shown in the front view, a screw hole SH engaging with a fixing bolt (not shown), an edge portion HG, and an inner peripheral step portion HD are provided.

In the example of code plate made up of three members as shown in FIGS. 3c and 3d, a disk DS constituting the body portion of the code plate 1 is lapped on a collar portion HL of a hub HB serving as an attaching portion to a shaft member (not shown), and locked reinforcingly with a washer WS. As the material of the disk DS, metal is used, and in the region indicated by hatching in the front view, a code element (lattice pattern of transmitting portions and intercepting portions) as shown in FIG. 2 is formed by metal etching or the like. Also, the hub HB including the collar portion HL is made of a metal such as aluminum or brass.

As is the case of code plate made up of two members, the hub HB has a hollow construction, and as shown concentrically with the washer WS in the front view, a screw hole SH engaging with a fixing bolt (not shown), an edge portion HG, and an inner peripheral step portion HD are provided.

Thus, neither of the constructions shown in FIGS. 3a and 3b and FIGS. 3c and 3d are an integral construction in which the disk DS constituting the body portion of the code plate 1 is integral with the hub HB serving as an attaching portion. Therefore, when the disk DS is assembled to the hub HB (joining using adhesive, locking using washer), it is not easy to secure the alignment relationship (aligned state) between them. As a result, measures are taken such that alignment is performed with a heavy burden when the encoder is assembled, or faulty products are rejected in the inspection process at the sacrifice of a low yield.

The inventor of the present invention has made a proposal for solving problems 1 and 2 of the above problems 1 to 3 (PCT/JP98/00726). According to this proposal, a code plate using a lens element group arranged periodically is used as a means for converting the stationary beam from the light emitting section into a movable discrete beam group.

FIGS. 4a, 4b and 5 are views for illustrating one example of a code plate used in the aforementioned improvement proposal. In FIGS. 4a and 4b, a sectional view and a front view of an improved code plate denoted by reference numeral 6 are drawn, respectively, in a simplified form. The code plate 6 is provided with many lens elements 61 arranged periodically with a predetermined pitch in the circumferential direction. The lens element 61, which plays a role of movable slit (generation of movable discrete beam group) in the conventional code plate, is formed on one surface or both surfaces of the code element. By the rotation of the rotating shaft member 2 connected to a rotor shaft of motor or the like, these lens elements 61 are rotated around a center axis S.

FIG. 5 is a view for illustrating a generating operation of a movable discrete beam group in the case where the code plate 6 is used, in the same form as that of FIG. 2. The code plate 6 shown in this figure is made of a plastic such as acrylic resin and polycarbonate, and formed with many convex lens elements 61 on the light outgoing side thereof. The condensing power (refracting power) of each lens element 61 is designed so that the beam width of a movable beam MF is decreased to a half of the reference pitch IP when the movable beam MF reaches the light receiving device 42. Between the movable beams MF are formed shadow regions SD where the light does not pass through.

When the rotating shaft 2 of the code plate 6 connected to a rotor of motor or the like rotates, the code plate 6 is rotated, so that the rotational position of each lens element 61 changes synchronously by the same quantity in the same direction. Accordingly, the movable beam MF moves, and scans the surface on which the light receiving devices 42 are arranged.

As a result, of the quantity of light contained in the movable beam MF, the proportion of the quantity of light reaching the light receiving device 42 changes periodically. The quantity of light detected by each light receiving device 42 is converted into an electrical signal changing with that period, which is processed by a publicly known processing circuit. It is to be noted that FIG. 5 shows a state in which a positional relationship such that the quantity of light of the movable beams MF incident on the light receiving devices 42 is at a maximum (almost the whole quantity) holds between the code plate 6 and the light receiving device 42.

According to this improvement proposal, as is seen from the comparison between FIG. 2 and FIG. 5, in the conventional construction (FIG. 2), almost a half of the quantity of light is wasted when the stationary beam from the light emitting section is converted into the movable beams, while in the improved construction (FIG. 5), the waste of the quantity of light due to the interception of light does not occur when the stationary beam from the light emitting section is converted into the movable beams. Therefore, this construction can provide a signal output with a double efficiency in principle as compared with the conventional construction. Also, such a process as chromium deposition and metal etching is not needed. This construction is advantageous in terms of material cost and ease of fabrication.

DISCLOSURE OF INVENTION

An object of the present invention is to provide an optical rotary encoder using a plastic code plate, in which the number of parts including an attachment portion of code plate is small, so that it is easy to manufacture. Another object thereof is to provide an optical rotary encoder in which the aligned state of the code plate is secured in assembling.

According to the present invention, in an optical rotary encoder comprising a light emitting section, a code plate for converting light supplied from the light emitting section into a discrete movable beam group, and a light receiving section for receiving light contained in the discrete movable beam group, wherein the rotation amount or rotational speed of a rotating shaft is detected on the basis of a signal obtained from the light receiving section, a basic technical means for solving above technical problems is provided by configuring a body portion (code element forming portion) and an attachment portion (concentric holding portion to a shaft member of rotating shaft) of the code plate by an integrated plastic molded product.

Further, for the concentric holding of the code plate, alignment holding means for performing the concentric holding of the code plate in an aligned state with respect to the rotating shaft can further be provided.

Also, in a preferred mode, a fitting and holding mechanism for fitting one of the attachment portion and the shaft member to the other and holding it is provided to perform the concentric holding of the code plate. The fitting and holding mechanism can include an alignment holding portion capable of being deformed plastically which is provided on at least one of the outer periphery and the inner periphery of the attachment portion. In this case, when the attachment portion and the shaft member are fitted to each other, the alignment holding portion is deformed in the radial direction, by which the aligned state is secured. For the fitting of the attachment portion to the shaft portion, either a mode in which the attachment portion is fitted to the outside of the shaft member or a mode in which the attachment portion is fitted to the inside of the shaft member can be used.

The fitting and holding mechanism can include an alignment holding portion capable of being deformed plastically which extends in the circumferential direction on at least one of the outer periphery and the inner periphery of the attachment portion. In this case, when the attachment portion and the shaft member are fitted to each other, the alignment holding portion is deformed elastically in the radial direction, by which the aligned state is secured. In this case as well, either a mode in which the attachment portion is fitted to the outside of the shaft member or a mode in which the attachment portion is fitted to the inside of the shaft member can be used.

Further, the fitting and holding mechanism may include tapered surfaces formed on both of the attachment portion and the shaft member so that alignment of the code plate with respect to the rotating shaft is performed through a fitting operation for bringing the tapered surfaces into contact with each other.

In order to fix the attachment portion and the shaft member to each other in a state in which one of the attachment portion and the shaft member is fitted to the other, an adhesive, not a fixing bolt, can be used. As a code element of the plastic code plate used in the present invention, a code element having a plurality of lens elements arranged periodically in the circumferential direction is typical.

According to the present invention, the code plate is formed of an integrated plastic molded product, and is provided with an aligning means for performing the concentric holding of the code plate in a state in which the code plate is aligned with respect to the rotating shaft. Therefore, the optical rotary encoder in accordance with the present invention is simple in construction and easy to manufacture, and can easily secure the aligned state in assembling.

BRIEF DESCRIPTION OF DRAWINGS

FIGS. 3a to 3d show assembly constructions of conventional code plates,

FIG. 3a being a side view of a code plate made up of two members,

FIG. 3b being a front view thereof,

FIG. 3c being a side view of a code plate made up of three members, and

FIG. 3d being a front view thereof;

FIG. 5 is a view for illustrating the generating operation of a movable discrete beam group in the case where a plastic code plate is used;

FIGS. 6a and 6b show a configuration of a principal portion of a first embodiment of the present invention, in the same form as that of FIGS. 3a to 3d, FIG. 6a being a sectional view of an integrally molded code plate, and FIG. 6b being a simplified front view showing an appearance of the code plate;

FIGS. 8a to 8h are views for illustrating several other examples of alignment holding portions;

FIG. 10a being a sectional view before assembly, and

FIG. 11 is a sectional view showing an example of a lens element group formed on a code plate;

BEST MODE OF CARRYING OUT THE INVENTION

FIGS. 6a and 6b show a configuration of a principal portion of a first embodiment of the present invention, in the same form as that of FIGS. 3a to 3d. FIG. 6a is a sectional view of an integrally molded code plate, and FIG. 6b is a simplified front view showing an appearance of the code plate. As shown in FIGS. 6a and 6b, a disk DS constituting a body portion of a code plate 6 and an attachment portion DM to a shaft member 20 are formed of an integrally molded plastic product manufactured by, for example, injection molding.

Although the details are omitted in these figures, a lens group LS of an irregular shape is formed in the hatched portion of the disk DS in the front view. The forming mode (irregular shape and arrangement) and operation of the lens group LS are as explained, for example, with reference to FIGS. 3 and 4, but many other variations are available. These examples are described later.

The attachment portion DM formed concentrically with the disk DS has an insertion hole DE having an inside diameter equal to the outside diameter of a fitting portion RE of a shaft member 20 of a rotating shaft, and further has a threaded hole DH concentrically continuing with the insertion hole DE. The diameter of the threaded hole DH is designed so as to be smaller than the inside diameter of the insertion hole DE using a step portion DD. On the side of the shaft member 20, on the other hand, a threaded hole RH is formed concentrically with the fitting portion RE.

Thus, the code plate 6 is made up of one member, so that the assembly work for the code plate 6 itself is unnecessary, and therefore an error caused by the assembly work does not occur. That is to say, by increasing the molding accuracy of the code plate 6, the concentric relationship between the disk DS and the attachment portion DM can be secured. The alignment in installing the disk plate 6 to the shaft member 20 is performed through an operation of inserting the fitting portion RE of the shaft member 20 into the insertion hole DE, whereby the concentric relationship between the disk plate 6 and the shaft member 20 is secured.

Figure 7B:
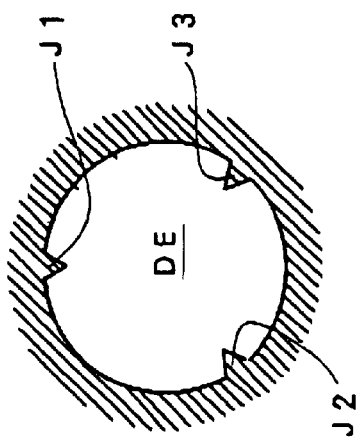
FIG. 7b shows alignment holding portions provided in an insertion hole.
Figure 7D:
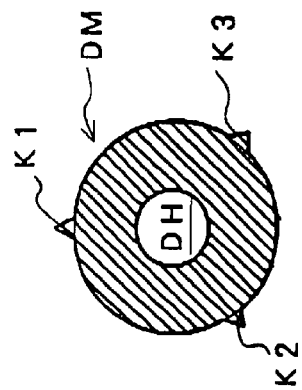
FIG. 7d shows alignment holding portions provided at an attachment portion.
Figure 7A:
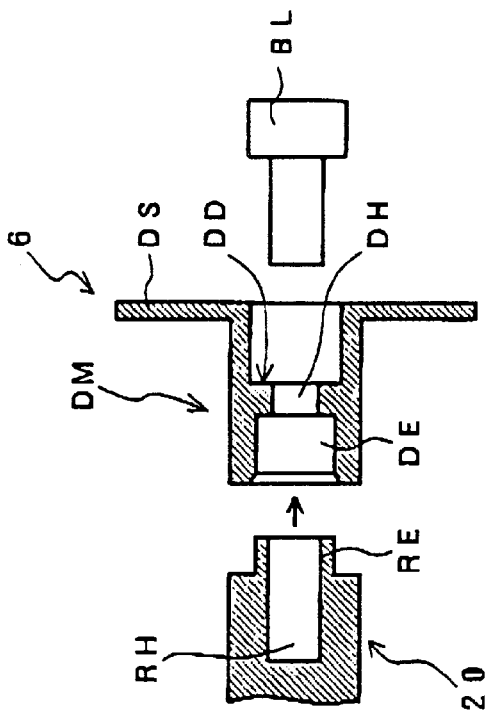
FIG. 7a is a sectional view showing a configuration of a principal portion of a second embodiment of the present invention.
Figure 7C:
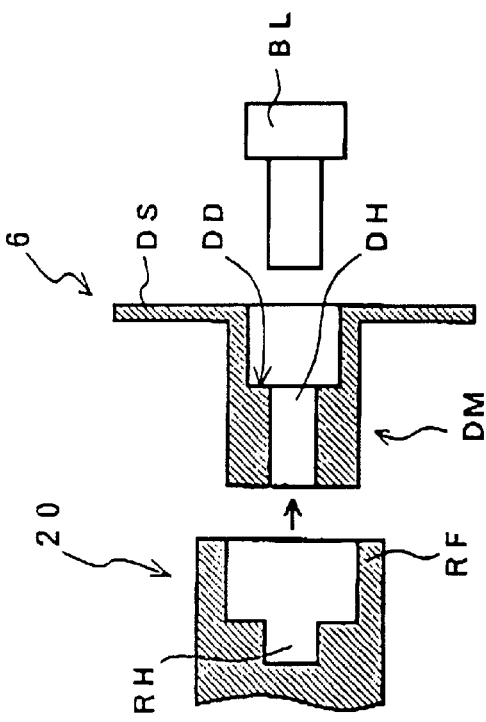
FIG. 7c is a sectional view showing a configuration of a principal portion of a third embodiment.

FIGS. 7a and 7b are a sectional view showing a configuration of a principal portion of a second embodiment of the present invention and a view for illustrating alignment holding portions, respectively. FIGS. 7c and 7d are a sectional view showing a configuration of a principal portion of a third embodiment of the present invention and a view for illustrating alignment holding portions, respectively. The second embodiment shown in FIGS. 7a and 7b has almost the same construction as that of the first embodiment except that alignment holding portions J1 to J3 are provided on the inner periphery of the insertion hole DE of the attachment portion DM of the code plate 6. Specifically, the disk DS constituting the body portion of the code plate 6 and the attachment portion DM to the shaft member 20 are formed of an integrally molded plastic product manufactured by, for example, injection molding. A lens group of an irregular shape is formed in a predetermined region of the disk DS.

The attachment portion DM formed concentrically with the disk DS has the insertion hole DE and the threaded hole DH concentrically continuing with the insertion hole DE. On the inner peripheral surface of the insertion hole DE of the code plate 6, there are provided the alignment holding portions J1 to J3. The inside diameter of the insertion hole DE where the alignment holding portions J1 to J3 are absent is designed so as to be approximately equal to but not smaller than the outside diameter of the fitting portion RE of the shaft member 20.

It is preferable that the alignment holding portions J1 to J3 be integrally formed together with the other portion as plastically deformed protruding portions slightly protruding from the inner peripheral surface of the insertion hole DE toward the inside, and an appropriate number thereof be provided symmetrically with respect to the axis. The inside diameter of a portion of the insertion hole DE where the alignment holding portions J1 to J3 are present is designed so as to be slightly smaller than the outside diameter of the fitting portion RE.

The diameter of the threaded hole DH of the code plate 6 is designed so as to be smaller than the inside diameter of the insertion hole DE by using the step portion DD. On the side of the shaft member 20, on the other hand, the threaded hole RH is formed concentrically with the fitting portion RE with the same diameter as that of the fitting portion RE.

As in the case of the first embodiment, the code plate 6 is made up of one member, so that the assembly work for the code plate 6 itself is unnecessary, and therefore an error caused by the assembly work does not occur. That is to say, by increasing the molding accuracy of the code plate 6, the concentric relationship between the disk DS and the attachment portion DM can be secured. The alignment in installing the disk plate 6 to the shaft member 20 is achieved by a plastic deformation (collapse) of the alignment holding portions through an operation of inserting (press fitting) the fitting portion RE of the shaft member 20 into the insertion hole DE, whereby the concentric relationship between the disk plate 6 and the shaft member 20 is secured. A fixing bolt BL is engaged with the threaded hole DH and the threaded hole RH in a state in which the concentric relationship is secured, whereby the disk plate 6 is fixed to the shaft member 20.

In a third embodiment shown in FIGS. 7c and 7d, alignment holding portions K1 to K3 are provided on the outer periphery of the attachment portion DM of the code plate 6. The disk DS constituting the body portion of the code plate 6 and the attachment portion DM to the shaft member 20 are formed of an integrally molded plastic product manufactured by, for example, injection molding. A lens group of an irregular shape is formed in a predetermined region of the disk DS.

The attachment portion DM formed concentrically with the disk DS has the threaded hole DH. On the outer peripheral surface of the attachment portion DM of the code plate 6, there are provided the alignment holding portions K1 to K3. The outside diameter of a portion of the attachment portion DM where the alignment holding portions K1 to K3 are absent is designed so as to be approximately equal to but not larger than the inside diameter (insertion hole) of a fitted portion RF of the shaft member 20.

It is preferable that the alignment holding portions K1 to K3 be integrally formed together with the other portion as plastically deformed protruding portions slightly protruding from the outer peripheral surface of the attachment portion DM toward the outside, and an appropriate number thereof be provided symmetrically with respect to the axis. The outside diameter of a portion of the attachment portion DM where the alignment holding portions K1 to K3 are present is designed so as to be slightly larger than the inside diameter (insertion hole) of the fitted portion RF. The diameter of the threaded hole DH of the code plate 6 is formed so as to be equal to the diameter of the threaded hole RH provided concentrically on the side of the shaft member 20 by using the step portion DD.

As in the case of the first and second embodiments, the code plate 6 is made up of one member, so that the assembly work for the code plate 6 itself is unnecessary, and therefore an error caused by the assembly work does not occur. That is to say, by increasing the molding accuracy of the code plate 6, the concentric relationship between the disk DS and the attachment portion DM can be secured. The alignment in installing the disk plate 6 to the shaft member is achieved by a plastic deformation (collapse) of the alignment holding portions through an operation of inserting (press fitting) the attachment portion DM of the disk plate 6 into the fitted portion RF of the shaft member 20, whereby the concentric relationship between the disk plate 6 and the shaft member is secured. The fixing bolt BL is engaged with the threaded hole DH and the threaded hole RH in a state in which the concentric relationship is secured, whereby the disk plate 6 is fixed to the shaft member 20.

The alignment holding portions shown in FIGS. 7b and 7d are provided in the insertion hole DE or the outer peripheral surface of the attachment portion DM as protrusions capable of being deformed plastically in the radial direction. Instead, it is possible to use alignment holding portions capable of being deformed plastically which are provided in a form of extending in the circumferential direction.

FIGS. 8a to 8h show examples of alignment holding portions. In FIG. 8, alignment holding portions denoted by reference characters L1 to L3, M1 to M3, N1 to N3, and O1 to O3 are examples in which protrusions capable of being deformed plastically in the radial direction are provided on the inner peripheral surface of the insertion hole DE in a form of extending in the circumferential direction. In the leftmost example in which the alignment holding portions are denoted by reference characters L1 to L3, the position of the outer periphery of the fitting portion RE is indicated by the broke line to which reference character Z1 is applied. Also, alignment holding portions denoted by reference characters P1 to P3, Q1 to Q3, R1 to R3, and S1 to S3 are examples in which protrusions capable of being deformed plastically in the radial direction are provided on the outer peripheral surface of the attachment portion DM in a foam of extending in the circumferential direction. In the leftmost example in which the alignment holding portions are denoted by reference characters R1 to R3, the position of the inner periphery of the fitted portion RF is indicated by the broken line to which reference character Z2 is applied.

When the former alignment holding portions L1 to L3, M1 to M3, and N1 to N3 are used, the alignment in installing the disk plate 6 to the shaft member is achieved by a radial elastic deformation of the alignment holding portions L1 to L3, M1 to M3, N1 to N3, and O1 to O3 through an operation of inserting (press fitting) the fitting portion RE of the shaft member into the insertion hole DE, whereby the concentric relationship between the disk plate 6 and the shaft member 20 is secured.

On the other hand, when the latter alignment holding portions P1 to P3, Q1 to Q3, R1 to R3, and S1 to S3 are used, the alignment in installing the disk plate 6 to the shaft member is achieved by a radial elastic deformation of the alignment holding portions P1 to P3, Q1 to Q3, R1 to R3, and S1 to S3 through an operation of inserting (press fitting) the attachment portion DM into the fitted portion RF on the shaft member side, whereby the concentric relationship between the disk plate 6 and the shaft member 20 is secured.

In both cases, the fixing bolt BL is engaged with the threaded hole DH and the threaded hole RH in a state in which the concentric relationship is secured, whereby the disk plate 6 can be fixed to the shaft member 20.

Figure 9B:
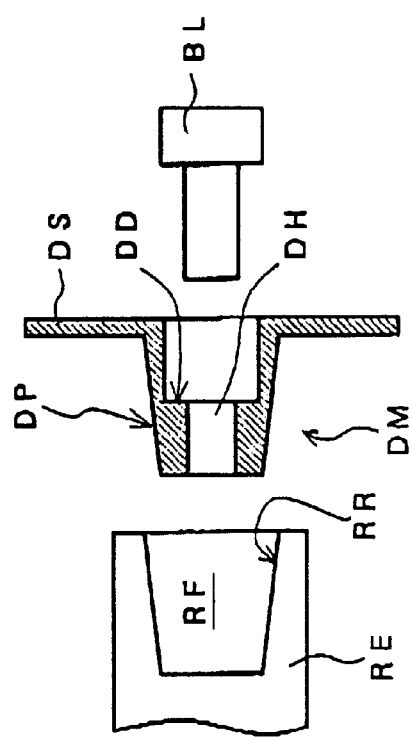
FIG. 9b is a sectional view showing a configuration of a principal portion of a fifth embodiment.
Figure 9A:
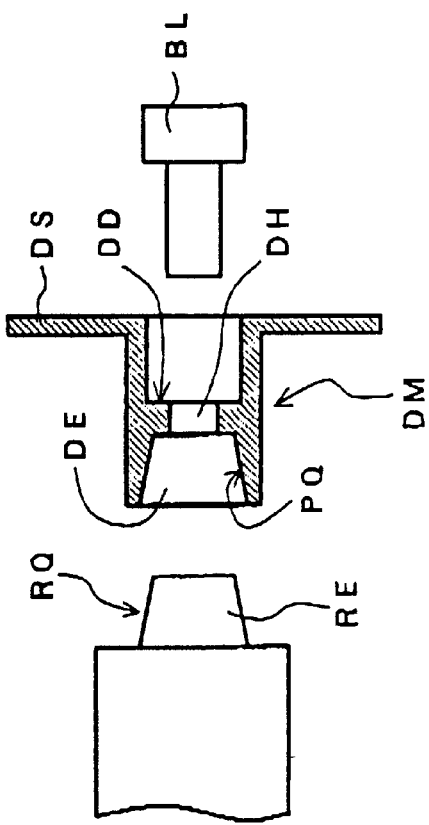
FIG. 9a is a sectional view showing a configuration of a principal portion of a fourth embodiment of the present invention.

FIG. 9a is a sectional view showing a configuration of a principal portion of a fourth embodiment of the present invention, and FIG. 9b is a sectional view showing a configuration of a principal portion of a fifth embodiment.

The fourth embodiment shown in FIG. 9a is characterized in that the inner periphery of the insertion hole DE of the attachment portion DM of the code plate 6 and the outer periphery of the fitting portion RE of the shaft member 20 consist of tapered surfaces DQ and RQ which fit to each other, respectively. Other configurations are the same as those of the first embodiment, so that the repeated explanation is omitted.

In this embodiment as well, as in the case of the first embodiment, the code plate 6 is made up of one member, so that the assembly work for the code plate 6 itself is unnecessary, and therefore an error caused by the assembly work does not occur. That is to say, by increasing the molding accuracy of the code plate 6, the concentric relationship between the disk DS and the attachment portion DM can be secured. The alignment in installing the disk plate 6 to the shaft member 20 is achieved by an operation of inserting the fitting portion RE of the shaft member 20 into the insertion hole DE while using the tapered surfaces DQ and RQ as guide means, whereby the concentric relationship between the disk plate 6 and the shaft member 20 is secured. The fixing bolt BL is engaged with the threaded hole DH and the threaded hole RH in a state in which the concentric relationship is secured, whereby the disk plate 6 is fixed to the shaft member 20.

On the other hand, the fifth embodiment shown in FIG. 9b is characterized in that the outer periphery of the attachment portion DM of the code plate 6 and the inner periphery of the fitted portion RF of the shaft member 20 consist of tapered surfaces DP and RR which fit to each other, respectively. Other configurations are the same as those of the first embodiment, so that the repeated explanation is omitted.

In this embodiment as well, the code plate 6 is made up of one member, so that the assembly work for the code plate 6 itself is unnecessary, and therefore an error caused by the assembly work does not occur. Thereupon, by increasing the molding accuracy of the code plate 6, the concentric relationship between the disk DS and the attachment portion DM can be secured.

The alignment in installing the disk plate 6 to the shaft member 20 is achieved by an operation of inserting the attachment portion DM of the disk 6 into the fitted portion RF of the shaft member 20 while using the tapered surfaces DP and RR as guide means, whereby the concentric relationship between the disk plate 6 and the shaft member 20 is secured. The fixing bolt BL is engaged with the threaded hole DH and the threaded hole RH in a state in which the concentric relationship is secured, whereby the disk plate 6 is fixed to the shaft member 20.

Figure 10B:
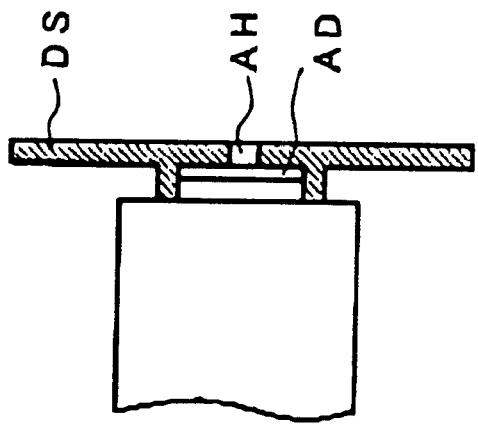
FIG. 10b being a sectional view after assembly and fixing.
Figure 10A:
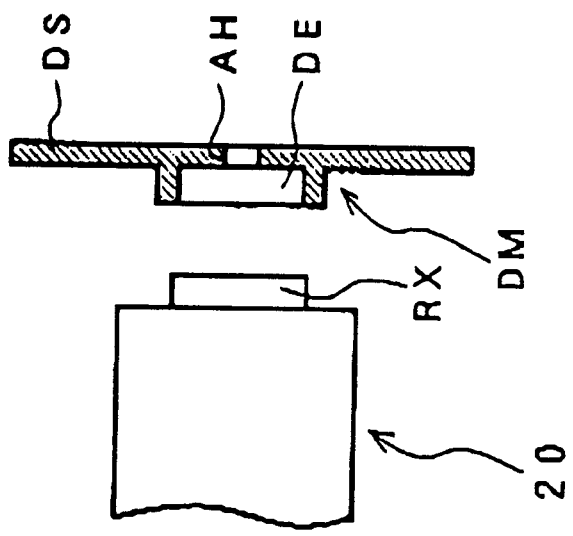
FIG. 10a is a sectional view for illustrating an example in which an adhesive is used to fix a shaft member to an attachment portion, as a sixth embodiment.

In the embodiments explained above, a fixing bolt has been used to fix the attachment portion and the shaft member to each other in a state in which one of these elements is fitted to the other. However, an adhesive can be used. FIG. 10a is a sectional view for illustrating an example in which an adhesive is used, as a sixth embodiment. FIG. 10a is a sectional view before assembly, and FIG. 10b is a sectional view after assembly and fixing.

As shown in FIG. 10a, the disk DS constituting the body portion of the code plate 6 and the attachment portion DM to the shaft member 20 are formed of an integrally molded plastic product manufactured by, for example, injection molding. Like the above-described embodiments, a lens group of an irregular shape is formed in a predetermined region of the disk DS.

The attachment portion DM formed concentrically with the disk DS has the insertion hole DE having an inside diameter equal to the outside diameter of a fitting portion RX of the shaft member 20 of the rotating shaft. Also, at the center of the disk DS, there is formed an injection hole AH for injecting an adhesive AD.

In this embodiment as well, the code plate 6 is made up of one member, so that the assembly work for the code plate 6 itself is unnecessary, and therefore an error caused by the assembly work does not occur. That is to say, by increasing the molding accuracy of the code plate 6, the concentric relationship between the disk DS and the attachment portion DM can be secured.

The alignment in installing the disk plate 6 to the shaft member 20 is achieved by an operation of inserting the fitting portion RX of the shaft member 20 into the insertion hole DE, whereby the concentric relationship between the disk plate 6 and the shaft member 20 is secured. In this state, the adhesive AD is injected through the injection hole AH so that the disk plate 6 is fixed to the shaft member 20 using the adhesive AD.

Figure 1:
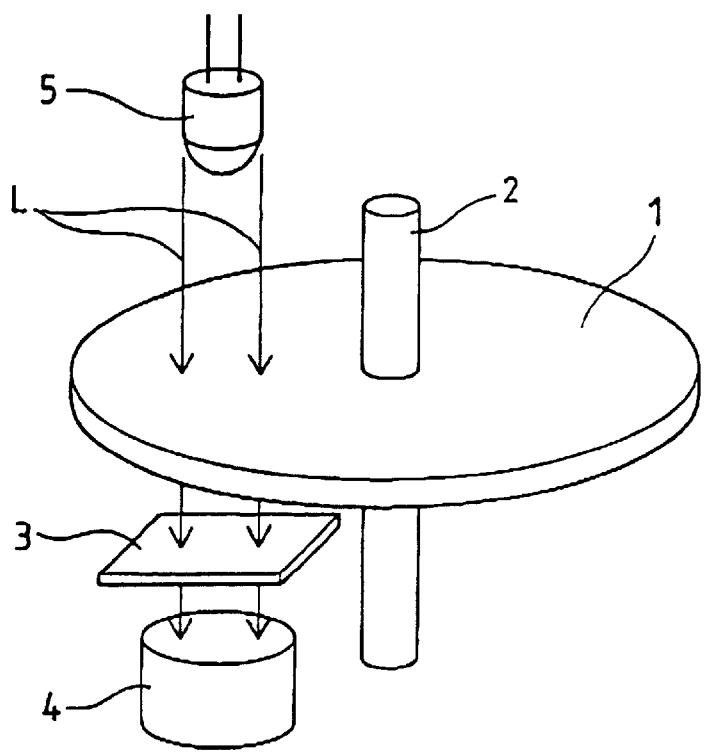
FIG. 1 is a view for illustrating a basic construction of an optical detection section by taking a rotary type optical rotary encoder as an example.
Figure 2:
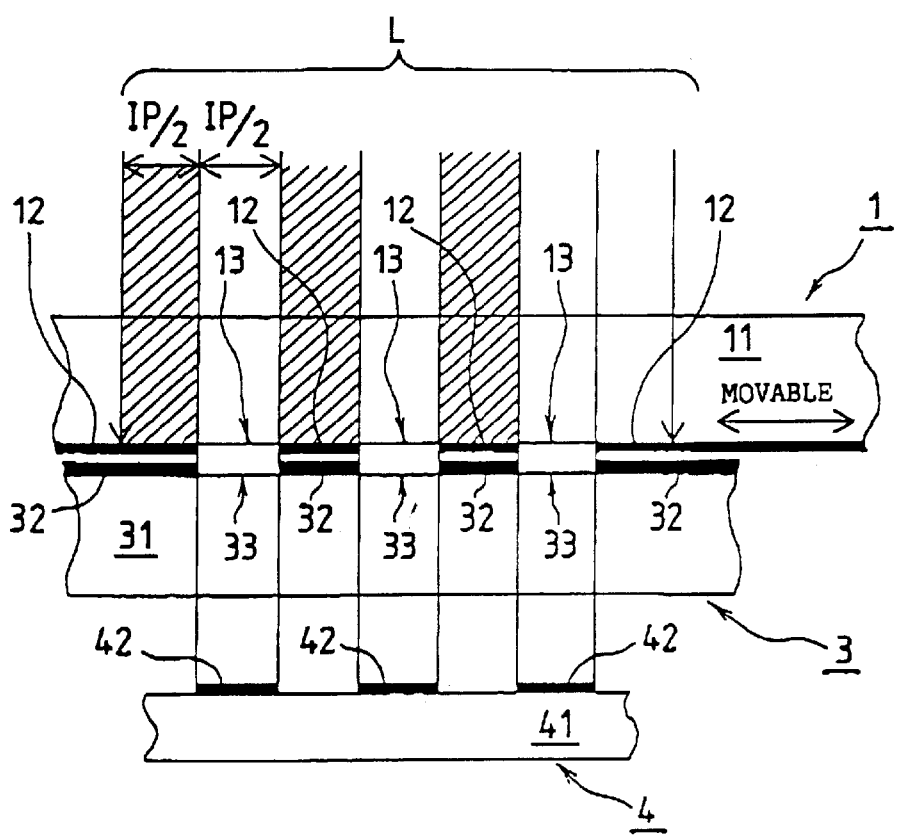
FIG. 2 is a view showing a general cross-sectional construction of a code plate (movable slit), fixed slit, and light receiving section used in the construction shown in FIG. 1.
Figure 4A:
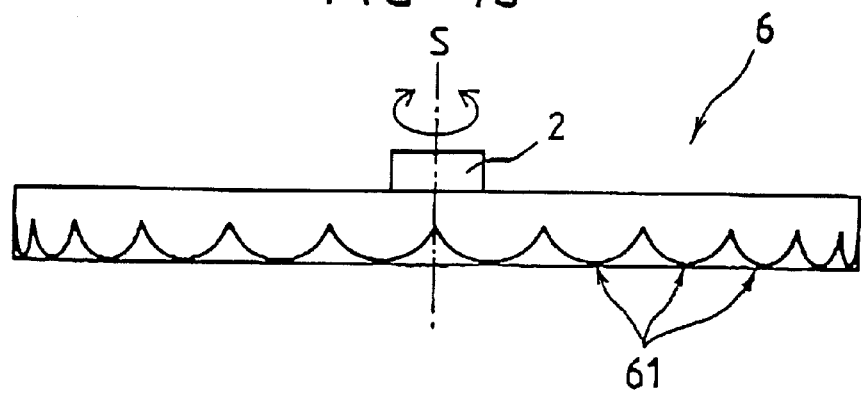
FIG. 4a is a side view showing the outline of a plastic code plate used for a rotary encoder.
Figure 4B:
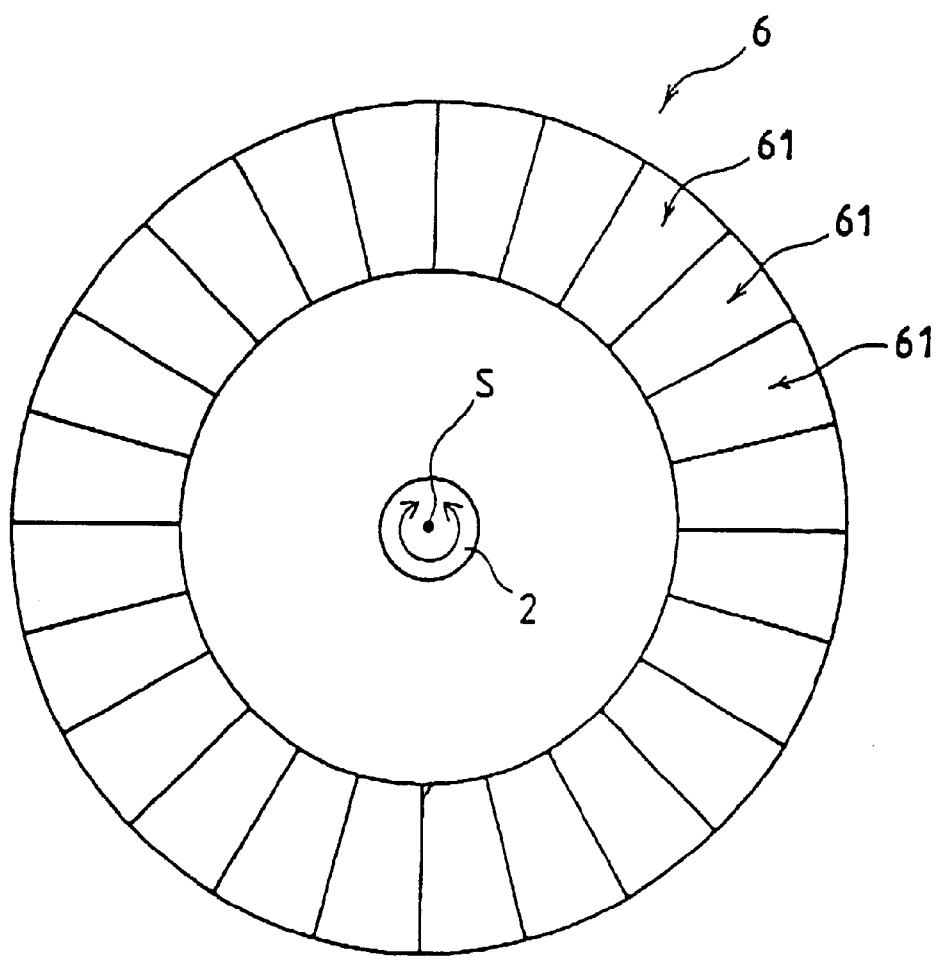
FIG. 4b is a front view thereof.

Finally, examples of lens element groups formed on the code plate, other than the example shown in FIGS. 4a, 4b and 5, will be explained with reference to FIGS. 11 to 13, which are similar to the sectional view of FIG. 5.

(Example Shown in FIG. 11)

In this example, a code plate 7 having a plurality of lens elements 71 and 72 arranged periodically with the reference pitch IP is used as a means for converting a stationary beam L from a light emitting section 5 into a plurality of movable beams MF. The lens element 71 provided on the incident side of the code plate 7 and the lens element 72 provided on the outgoing side are paired with each other. Thereupon, a stationary beam L having a width of IP (reference pitch) incident on the lens element 71 is contracted to approximately IP/2 in the interior as shown in the figure, and emitted as a parallel beam having a width of IP/2 from the lens element 72, thereafter entering a light receiving section 4. A portion SD indicated by hatching is a shadow portion where the movable beam does not pass through.

One feature of this example is that since the movable beam MF is obtained as a parallel beam, the distance d between the code plate 7 (corresponding to the conventional movable slit) and the light receiving section 4 is not restricted. Thereby, the code plate 7 and the light receiving section 4 can be disposed apart from each other without being in contact with each other. As a result, the flexibility of design is increased, and also the assembly is made easy. Also, this example has an advantage that even if a planar deflection of the code plate 7 occurs, the detection signal is scarcely affected because the movable beam MF is obtained as a parallel beam.

Figure 12:
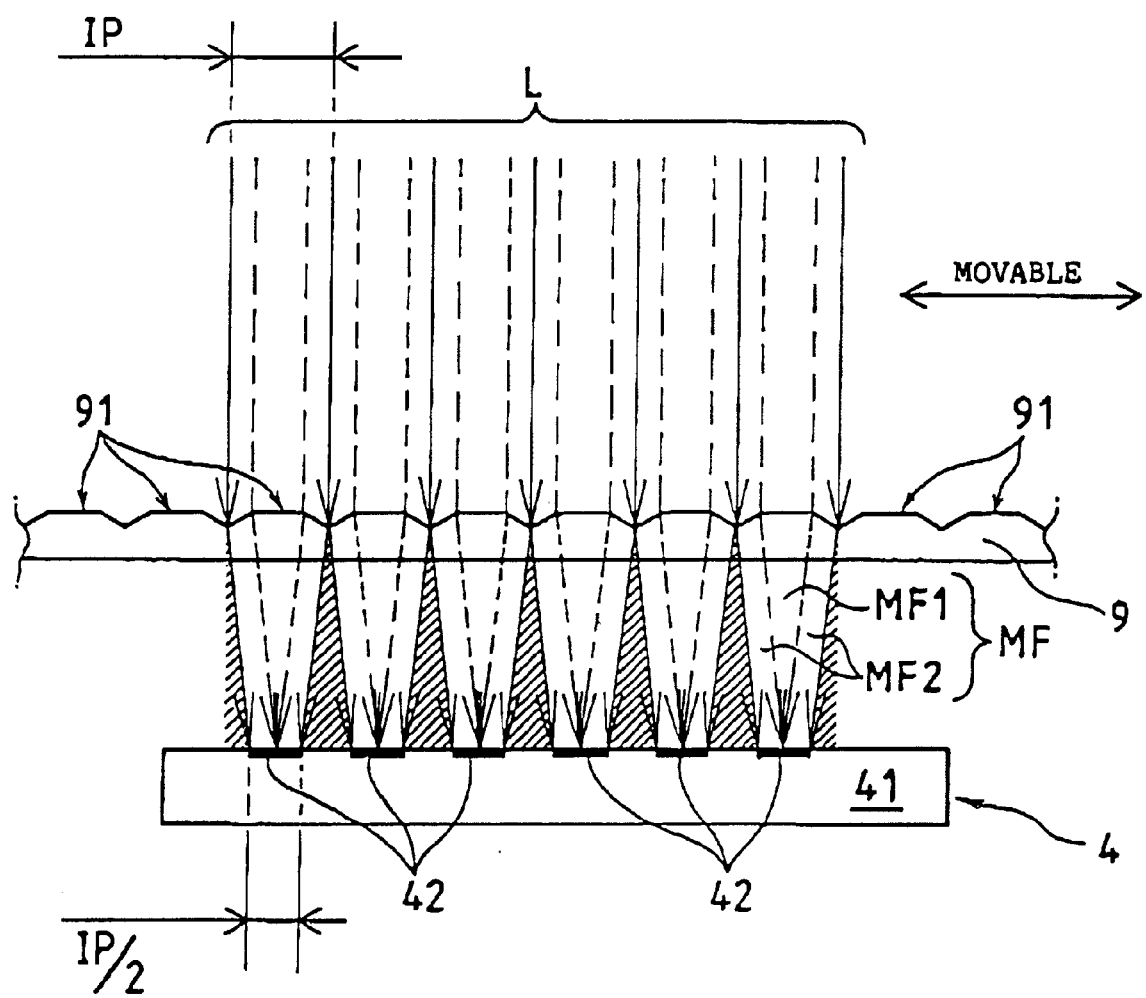
FIG. 12 is a sectional view showing another example of a lens element group formed on a code plate.

(Example Shown in FIG. 12)

A code plate 9 used in this example has, on the incident side, a plurality of trapezoidal lens elements 91 arranged periodically with the reference pitch IP. As shown in the figure, a stationary beam L with a width of IP (reference pitch) incident on the lens element 91 is converted into a movable beam MF containing a strongly convergent portion MF2 on the periphery thereof (composite of MF1 and MF2; MF1 is a parallel beam having a width of IP/2), and enters a light receiving section 4 in a state of being contracted to a width of IP/2 (a half of reference pitch). A portion SD indicated by hatching is a shadow portion where the movable beam does not pass through.

Figure 13:
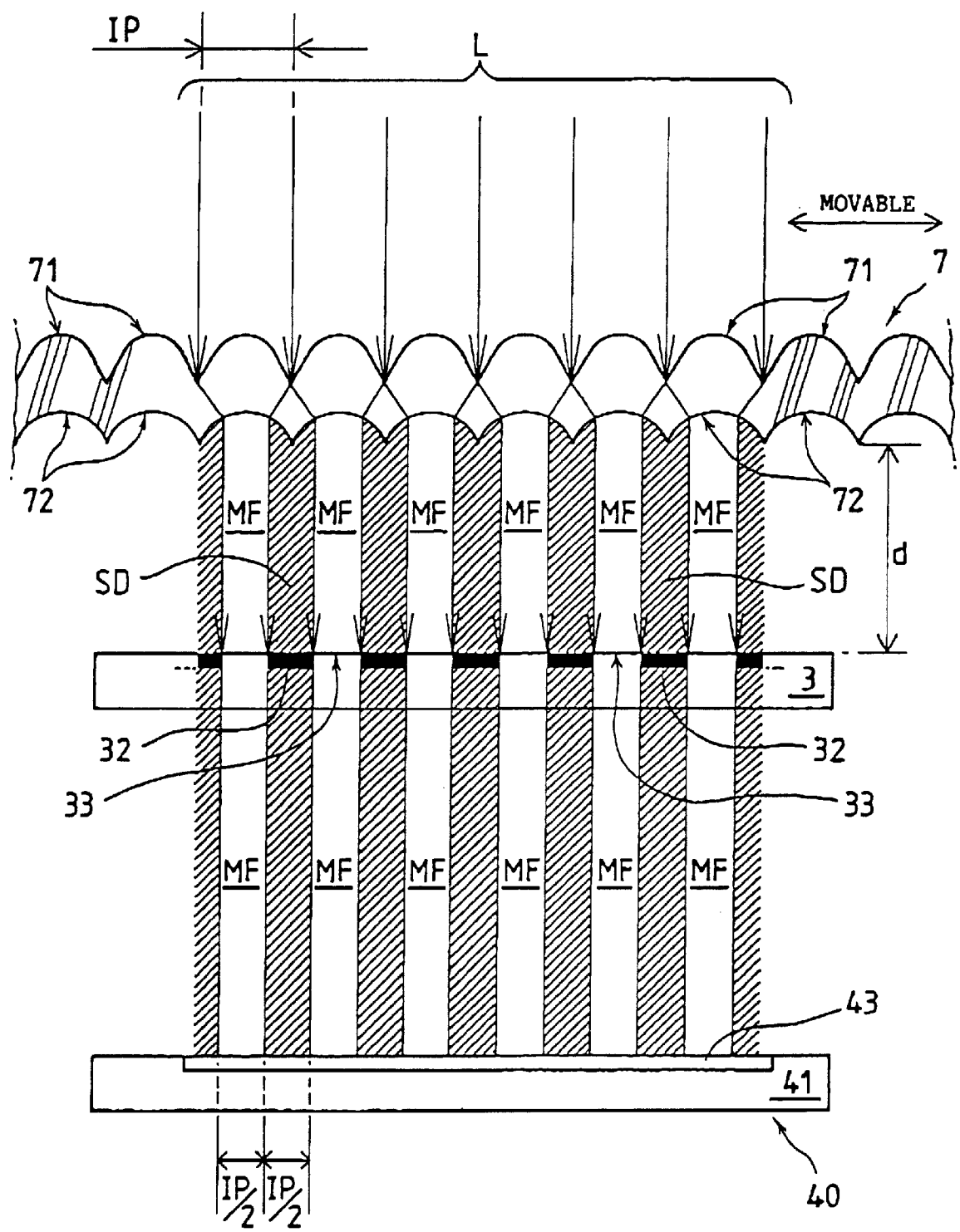
FIG. 13 is a sectional view showing still another example of a lens element group formed on a code plate.

(Example Shown in FIG. 13)

FIG. 13 shows an example in which a fixed slit is used to form the repeated arrangement of the light sensing zone and the light non-sensing zone of a light receiving section. In this example, a code plate 7 having a plurality of lens elements 71 and 72 arranged periodically with the reference pitch IP is used as a means for converting a stationary beam L from a light emitting section (not shown) into a plurality of movable beams MF.

The lens element 71 provided on the incident side of the code plate 7 and the lens element 72 provided on the outgoing side are paired with each other. A stationary beam L having a width of IP (reference pitch) incident on the lens element 71 is contracted to approximately IP/2 in the interior, and emitted as a parallel beam having a width of IP/2 from the lens element 72, thereafter entering a fixed slit 4. A portion SD indicated by hatching is a shadow portion where the movable beam does not pass through.

The fixed slit 3 is the same as that of the prior art. On the surface (one surface or both surfaces) of a transparent board 31, light intercepting portions 32 and light transmitting portions 33 are formed periodically with a pitch of a half of the reference pitch IP which is the same as that of the code plate 6. Therefore, of the movable beam MF, the component entering the light transmitting portions 33 (almost 100% in the state shown in the figure) goes toward a light receiving section 4, but the component entering the light intercepting portions 32 (almost 0% in the state shown in the figure) cannot go toward the light receiving section 4. The proportion of these components changes periodically as the code plate 7 rotates, and a signal corresponding to this is output from the light receiving section 4.

The optical rotary encoder in accordance with the present invention is formed of an integrated plastic molded product including the attachment portion, and the aligned state of the code plate with respect to the rotating shaft is secured. Therefore, there is provided a high-quality and less-costly optical rotary encoder which is simple in construction and easy in manufacture.

What is claimed is:

1. An optical rotary encoder for detecting a rotational amount or a rotational speed of a rotational shaft, comprising:

a light emitting section;

a code plate having a body portion for converting light supplied from said light emitting section into a discrete movable beam group and an attachment portion for holding said body portion concentrically with the rotational shaft, said body portion and said attachment portion being formed integrally with each other by integrated plastic molding; and a light receiving section for receiving light contained in said discrete movable beam group.

2. An optical rotary encoder according to claim 1, further comprising a fitting and holding mechanism fitting and holding said attachment portion and said rotational shaft to each other and performing the concentric holding.

3. An optical rotary encoder for detecting a rotational amount or a rotational speed of a rotational shaft, comprising:

a light emitting section;

a code plate having a body portion for converting light supplied from said light emitting section into a discrete movable beam group and an attachment portion for holding said body portion concentrically with the rotational shaft, said body portion and said attachment portion being formed integrally with each other by integrated plastic molding; and a light receiving section for receiving light contained in said discrete movable beam group said optical rotary encoder includes alignment holding means for performing the concentric holding of said code plate in alignment with said rotational shaft.

4. An optical rotary encoder according to claim 3, further comprising a fitting and holding mechanism fitting and holding said attachment portion and said rotational shaft to each other performing the concentric holding.

5. An optical rotary encoder according to claim 4, wherein said fitting and holding mechanism includes an alignment holding portion plastically deformable and provided on at least one of an outer periphery and an inner periphery of said attachment portion, and said alignment holding portion is plastically deformed in a radial direction when said attachment portion and said rotational shaft are fitted to each other, performing alignment of said code plate with said rotational shaft.

6. An optical rotary encoder according to claim 4, wherein said fitting and holding mechanism includes an alignment holding portion elastically deformable and provided on at least one of an outer periphery and an inner periphery of said attachment portion extending in circumferential direction, and said alignment holding portion is elastically deformed in radial direction when said attachment portion and said rotational shaft are fitted to each other, performing the alignment of said code plate with said rotational shaft.

7. An optical rotary encoder according to claim 4, wherein said fitting and holding mechanism includes tapered surfaces formed on both of said attachment portion and said rotational shaft, and the alignment of said code plate with said rotational shaft is performed by a fitting operation to bring said tapered surfaces into contact with each other.

8. An optical rotary encoder according to claim 3, wherein said attachment portion and said rotational shaft are bonded to be fitted to each other in a state in which said attachment portion and said shaft member are fitted to each other.

9. An optical rotary encoder according to claim 8, wherein said code plate comprises a plurality of lens elements arranged periodically in circumferential direction and light supplied from said light emitting section is converted into a discrete beam group by said plurality of lens elements.

* * * * *

UNITED STATES PATENT AND TRADEMARK OFFICE
CERTIFICATE OF CORRECTION

PATENT NO.    : 6,255,644 B1
DATED         : July 3, 2001
INVENTOR(S)   : Mitsuyuki Taniguchi et al.

Page 1 of 1

It is certified that error appears in the above-identified patent and that said Letters Patent is hereby corrected as shown below:

Item [57], ABSTRACT,
Line 3, after "shaft" insert -- . --.

Column 1,
Line 26, insert a "space" between the words "transmitting" and "portions".

Signed and Sealed this

Twenty-fifth Day of December, 2001

Attest:

JAMES E. ROGAN
*Attesting Officer*    *Director of the United States Patent and Trademark Office*